United States Patent [19]

Schweitzer et al.

[11] 4,026,251
[45] May 31, 1977

[54] ADAPTIVE CONTROL SYSTEM FOR POWER PRODUCING MACHINES

[75] Inventors: Paul H. Schweitzer; Carl Volz; Thomas W. Collins, all of State College, Pa.

[73] Assignee: Pennsylvania Research Corporation, University Park, Pa.

[22] Filed: Nov. 26, 1975

[21] Appl. No.: 635,437

[52] U.S. Cl. .................. 123/32 EA; 123/148 E
[51] Int. Cl.² ................ F02B 3/02; F02B 3/12; F02B 3/04
[58] Field of Search .............. 123/32 EA, 148 E

[56] References Cited

UNITED STATES PATENTS

| | | | |
|---|---|---|---|
| 3,898,962 | 8/1975 | Honig et al. | 123/148 E |
| 3,908,616 | 9/1975 | Sasayama | 123/32 EC |
| 3,921,610 | 11/1975 | Hartig | 123/148 E |
| 3,955,723 | 5/1976 | Richards | 123/148 E |

*Primary Examiner*—Verlin R. Pendegrass
*Assistant Examiner*—Thomas H. Webb
*Attorney, Agent, or Firm*—Thomas J. Nikolai

[57] ABSTRACT

An adaptive digital electronic control system for an internal combustion engine wherein a given speed modifying parameter is perturbated about a given setting and the resulting effect on the engine's output shaft speed is computed for producing an electrical control signal for adjusting the setting in a way which tends to maximize the shaft output power. Described are arrangements whereby the electronic control system can be applied to a spark ignition system, the air/fuel control of a standard carburetor or the air/fuel control of a fuel injection system.

9 Claims, 6 Drawing Figures

ADAPTIVE CONTROL SYSTEM FOR POWER PRODUCING MACHINES

BACKGROUND OF THE INVENTION

This invention relates generally to an extremum seeking, closed-loop control system for maximizing the power of a power producing machine, and more specifically to an electronic implementation of such a control system.

There is disclosed in U.S. Pat. No. 3,142,967 to Paul H. Schweitzer a method and apparatus for optimizing the power output of a machine by introducing periodic perturbations (hereinafter referred to as dithering) of a control parameter and monitoring the effect of the dithering on the torque or speed of the machine. If the machine regularly accelerates while the parameter is on the increase, the control system will cause an increase in the parameter setting. If the machine regularly decelerates while the parameter is on the increase, the control system will cause a decrease in the parameter setting. Where machine acceleration results from a momentary downward adjustment of the parameter, the control system operates to decrease the parameter setting. However, where a momentary decrease in the parameter setting causes the machine to decelerate, the control system adjusts the parameter setting upward.

The implementation described in the aforereferenced Schweitzer patent is mechanical in nature and, as such, is somewhat difficult to adapt to a wide range of machines. For example, when applying the invention to the internal combustion engine of an automobile, problems arise due to the wide variations among manufacturers in the location and construction of the engine speed controlling parameters and the space availability for properly mounting the optimizer structure. As a result, the invention has not met with wide reception as an add-on feature due to the installation problem and the higher cost resulting from the necessity of customizing the unit.

The present invention obviates these problems. Rather than a mechanical implementation, the optimizer control of the present invention employs solid-state electronic digital type circuitry which is comparatively inexpensive to manufacture, universal in application and simple to install in a wide variety of applications.

More specifically, in accordance with the teachings of the present invention, an electronic oscillator is provided for producing dither pulses of a relatively long duration and low repetition rate. The dither pulses are applied to a suitable transducer such as an electric motor or solenoid which is used to produce slight variations of a speed controlling parameter of the engine. Coupled to the engine shaft is an electrical pulse generating device which produces pulses of a relatively high rate compared to the rate at which the dither pulses are produced by the oscillator. Also, the high frequency pulses are produced at a rate which is directly proportional to the speed of the engine's output shaft.

The dither pulses are also applied to timing networks which effectively divide the dither pulse period into segments. The output of the timing networks are coupled through coincidence circuits (AND gates) to the input terminals of an up-down pulse counting network. Applied to second inputs of these AND gates are the high frequency pulses whose rate is proportional to the instantaneous angular velocity of the output shaft. Thus, during a first portion of a dither pulse, the counter network counts up the number of high frequency pulses received and subsequently, during a second equal portion of the dither pulse, the counter network is decremented by the number of high frequency pulses received during this second time interval. If the count passes through zero, it is known that the engine shaft has accelerated as a result of the dithering of the speed controlling parameter. However, if the count remains positive during the countdown period, it is known that the engine shaft has decelerated. Thus, the counter serves to develop the algebraic difference (diffeence with sign) of the engine shaft speed indicating pulses occurring during successive intervals of a dither pulse.

The output from the counter is coupled through a logic device including flip-flops and gates, to a suitable transducer whose output is used to either increase or decrease the parameter setting so as to maximize the engine shaft speed and torque.

OBJECTS

It is accordingly the principal object of the present invention to provide a new and improved speed optimizing control network for a machine.

Another object of this invention is to provide an improved adaptive control system for optimizing the rotational speed of an engine shaft for a given setting of an engine speed controlling parameter which is electronic in nature.

Still another object of the invention is to provide a solid-state digital network for obtaining such optimization.

Yet another object of this invention is to provide an engine speed optimizing device which is readily adaptable to a variety of machines having various types of engine speed controlling parameters.

These and other objects and advantages of the invention will become apparent to those skilled in the art from a reading of the following detailed description of the preferred embodiment, as illustrated in the accompanying drawings in which:

DESCRIPTION OF PREFERRED EMBODIMENT

As is explained in the aforereferenced Schweitzer patent No. 3,142,967, almost every type of power-producing machine, such as internal combustion engines; turbines; electric motors; etc., commonly have one or more selectively adjustable engine speed controlling variables, such as spark timing; fuel injection timing; air/fuel ratio; turbine nozzle area; field current; etc. For each of these machines, generally there is an optimum power setting for each speed controlling variable, and if a setting is other than at its optimum, the machine power output can be increased by judiciously increasing or decreasing the variable setting until maximum power output is obtained from the machine relative to that variable setting. Factors other than the particular variable setting also have an effect on the machine's performance. For example, such things as load changes, fuel grade changes, voltage variations, etc., can affect the performance of the machine. The machine control system of the type described herein enables the machine with which it is used to automatically adjust its speed controlling parameters to establish the optimum setting for the machine control irrespective of changes in operating conditions.

Figure 1:
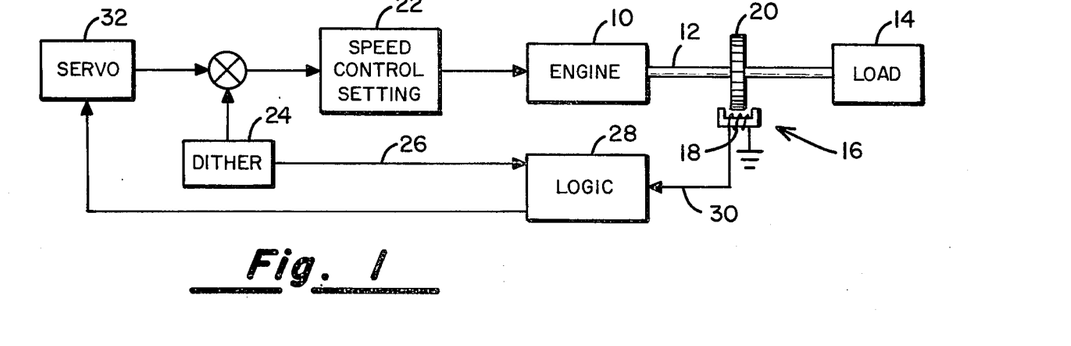
FIG. 1 shows a block diagram of the basic method for obtaining optimization of engine speed by the proper selection of the setting of an engine speed control parameter.

FIG. 1 is a block diagram showing the general arrangement of the machine control optimizing system. The machine under control 10 has an output shaft 12 coupled to a load 14. Coupled to the shaft 12 either directly or indirectly is a device indicated generally by numeral 16, the function of which is to produce a signal indicative of the instantaneous angular velocity of the shaft 12. Device 16 will hereinafter be referred to as a Celsig which is a coined acronym standing for acceleration/deceleration signaler. In FIG. 1, the Celsig is shown as comprising a variable reluctance coil 18 juxtaposed to a notched ferromagnetic wheel 20 which is driven by the shaft 12. As the shaft rotates, electrical pulses are induced in the winding 18 at a rate which is indicative of the rotational speed of the shaft 12. It is to be understood, however, that other forms of Celsigs may be employed, e.g., a rotating optical chopper and photocell combination, a tachometer, etc.

Also included in the basic system is a speed control setting 22 which is coupled to the engine 10. As has been mentioned above, the speed control parameter which is represented by block 22 in the Figure may take any one of a number of forms depending upon the nature of the machine 10. For example, if it is assumed that the engine 10 is an internal combustion engine, the device 22 may establish the throttle position in the carburetor or the spark timing in the ignition system. The setting may be either manually or automatically established.

Coupled to the speed control setting is a dither device represented by box 24 which is effective to introduce small, periodic and relatively low frequency (as compared to the frequency of the output from the Celsig 16) perturbations of the speed control setting, both upward and downward. The dither device 24 also provides an output by way of link 26 to a logic network 28 which, in turn, also receives the output from the Celsig 16 by way of link 30. The logic 28 examines the effect on the speed of the output shaft 12 caused by the perturbation introduced by the dither device 24 and provides an input to a servo device 32 which is also coupled to the speed control setting device 22.

If the logic 28 determines that the engine shaft 12 regularly accelerates while the parameter setting 22 is increased by the action of the dither device 24, a signal is provided from the logic 28 to the servo 32 which will cause an increase in the speed control setting established by device 22. However, if a deceleration of the engine shaft 12 results at the time that the dither device 24 is increasing the speed control setting, the logic 28 sends a signal to the servo device 32 which will cause a decrease in the speed control setting 22. In a similar fashion, where machine acceleration results from a momentary downward adjustment of the speed control parameter 22, the logic 28 provides a signal to the servo device 32 to decrease the speed control setting 22 and where a momentary decrease in the parameter setting by the dither device 24 causes the machine to decelerate, the logic and servo devices act to adjust the speed control setting upward.

Figure 2:
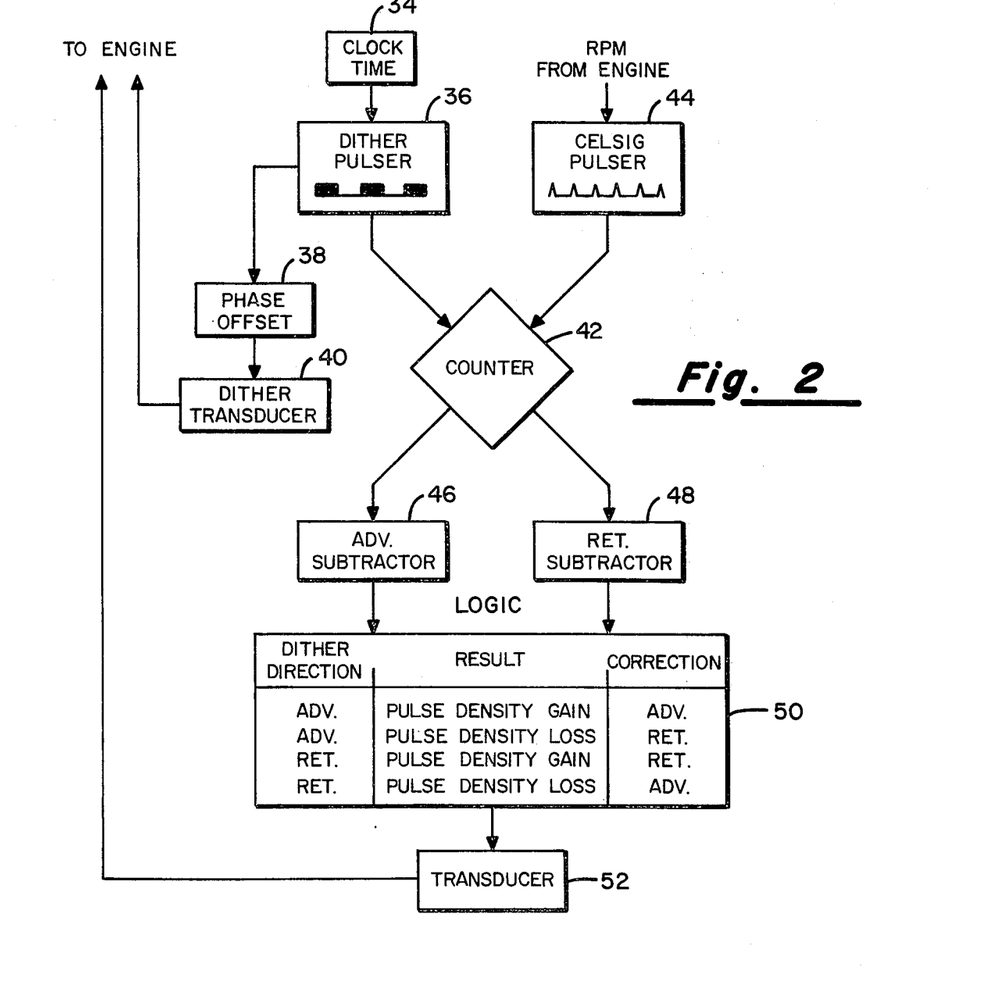
FIG. 2 is a block diagram of the preferred embodiment illustrating a simple electronic circuit for practicing the invention.

FIG. 2 is a general block diagram illustrating the principal features of the present invention. In this arrangement an electrical oscillator 34 produces regularly occurring pulses of a predetermined frequency to a dither pulser 36. The dither pulser 36 serves to subdivide the clock pulses from oscillator into first and second time intervals which may be adjusted to be equal to one another or of slightly differing durations, depending upon the desired engine performance results to be obtained. The output from the dither pulser 36 is applied through a phase offset 38 to a dither transducer 40 which is coupled to the engine speed controlling device so as to introduce the desired upward and downward perturbations to the instant gross setting.

The output from the dither pulser 36 is also connected to an input of a counter 42 which also receives as an input the relatively high frequency signals (as compared to the frequency of the output from the dither pulser) from the Celsig 44, the rate of the Celsig pulses being directly proportional to the instantaneous angular velocity of the engine's output shaft.

The counter 42 serves to total the number of Celsig pulses occurring during a period of one-half of the first and second portions of the output from the dither pulser 36 and the totals are effectively subtracted as represented by the blocks 46 and 48 in the diagram of FIG. 2. The resulting outputs from the subtractors 46 and 48 are applied to a digital logic network 50 which, in turn, provides an output to a transducer 52 which is linked to the parameter setting control of the engine to effect a desired alteration in the setting as determined by the logic 50.

In order to better understand the operation of the preferred embodiment, its use in controlling the setting of the spark timing of an internal combustion engine will be considered, but it should be understood that the invention is equally applicable to systems where it is desired to optimize the air/fuel ratio of the engine or other speed controlling parameter. The dither pulser 36 in FIG. 1 may be designed to produce alternate 0.1 second positive voltage and 0.1 second 0 voltage. When applied to the dither transducer 40, the signal of positive voltage may cause the spark timing to advance a given amount, e.g., three degrees from nominal, and a zero voltage may cause the spark timing to be retarded by 3°.

The Celsig pulser 44 reveals minute engine accelerations and decelerations in response to the dither signals. The counter 42 receives pulses from the dither pulser 36 and the Celsig unit 44 and is arranged to count up the number of Celsig pulses received during the first half of the advance period. It then counts down the number of Celsig pulses received during the second half of the advance period. The up and then down counting of the counter 42 is equivalent to determining the algebraic difference between the pulse counts during the first and second halves of the advance period. If the engine accelerates due to a 3° advance, the number of pulses received in the second half of the dither cycle will exceed the number received in the first half such that a negative result is obtained. The logic 50 responds to this negative signal and applies a signal to the transducer 52 which operates to advance the spark setting.

Next, the spark timing is suddenly retarded by 6° which is 3° from the initial or nominal setting. Because the machine still requires advance for optimum performance, the 3° retard will cause the engine to decelerate. During this period, the number of pulses received during the second half of the retard dither pulse will be less than the number received during the first half. The subtractor 48 will then produce a positive output and the logic 50 responds to this by causing the transducer 52 to initiate a further advance of the spark timing. This process repeats over and over such that setting corrections take place in small steps continuously and each step reduces the difference between the two counts. When the pulse count fluctuations disappear, the control parameter is at its optimum setting.

The purpose of the phase offset 38 disposed between the dither pulser 36 and the dither transducer 40 is to properly align the appropriate portion of the pulses from the dither pulses 36 with the response on the engine shaft as represented by the output from the Celsig pulser 44. More specifically, the dither pulser 36 sends out two signals, one going to the counter 42 and the other going to the dither transducer 40. In order to produce any change in engine speed, the altered spark timing must either improve or spoil the combustion. This introduces a delay which, in a six cylinder engine, may involve one-third of a revolution of the output shaft. The improved or spoiled combustion must either accelerate or decelerate the crank rotation sufficiently for the counter to detect a difference from the preceding pulse count. In order to make up for the time delay, the dither pulser 36 must sent its signals to the dither transducer 40 earlier than the corresponding signal to the counter 42. This is accomplished by the phase offset 38 which covers a fraction of a dither cycle. The amount of phase offset is a function of the dither pulse frequency and need not be changed so long as the dither pulse frequency is left unchanged.

The legends contained in the logic block 50 indicate the corrective output signals produced by the logic from the information received from the counter 42. The corrective command is then transmitted to transducer 52.

Figure 3:
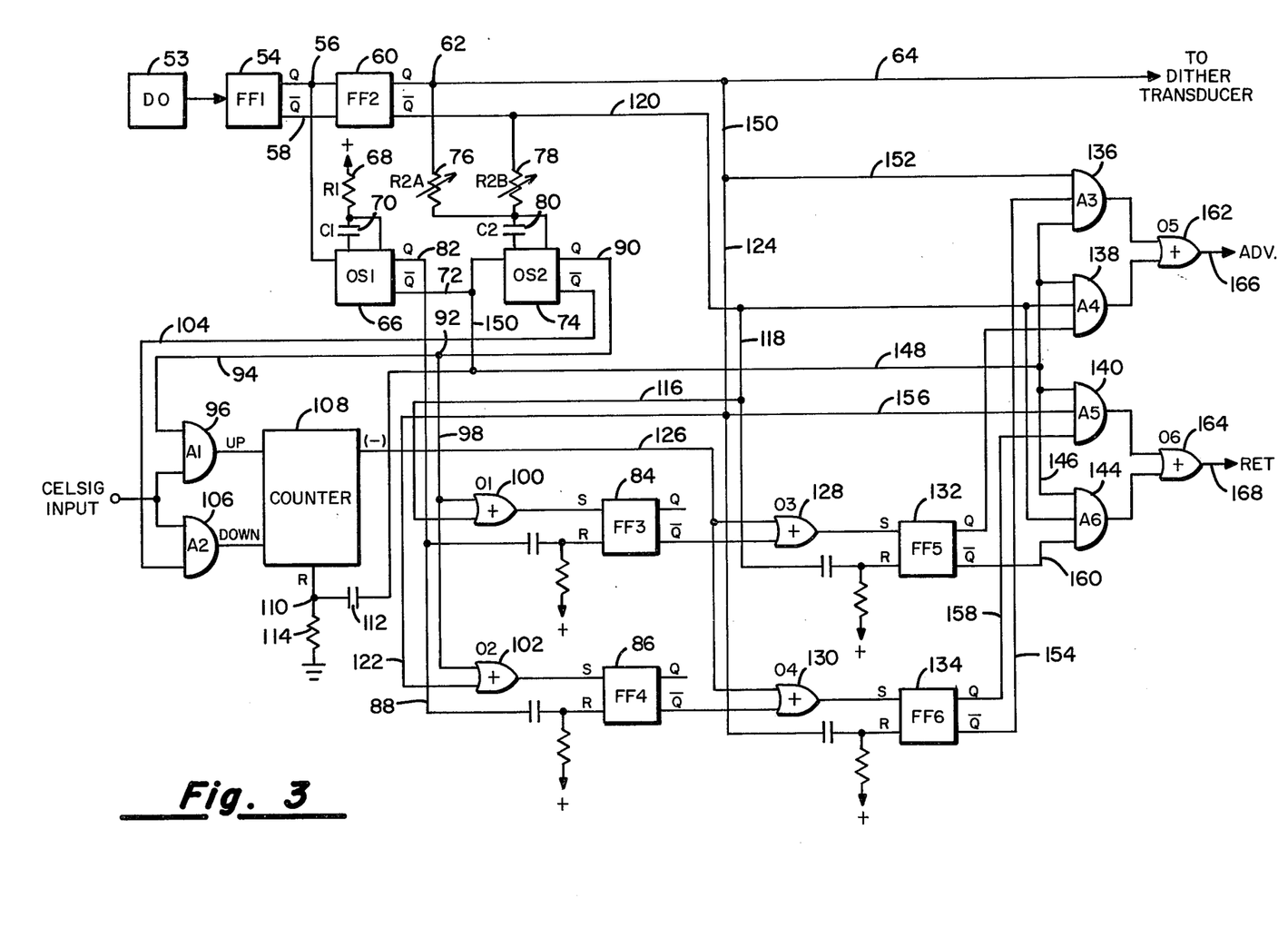
FIG. 3 is a detailed circuit diagram of the preferred embodiment.

FIG. 3 illustrates by means of a logic diagram the construction of the preferred embodiment represented diagrammatically in FIG. 2. An astable multivibrator 53 termed a "dither oscillator" produces regularly occurring square wave pulses which are applied as an input to a first bistable flip-flop 54. The bistable circuit 54 may comprise a commercially available J-K type flip-flop which has first and second output terminals 56 and 58 which carry complementary binary signals. Thus, when the flip-flop 54 is toggled to its Set state the Q output terminal 56 may be low whereas the Q output terminal 58 is high. Terminals 56 and 58 are connected to input terminals of a second bistable circuit 60 which too may be a type J-K flip-flop. Because of the manner in which the dither oscillator 53 is coupled to the flip-flops 54 and 60, flip-flops 54 and 60 (FF1 and FF2) may be considered as a frequency divider such that a given output terminal of the flip-flop 60 (FF2) outputs signals which have a frequency one-fourth of that of the dither oscillator 53. The Q output terminal 62 is adapted to be connected by a conductor 64 to the dither transducer (not shown) the particular design of which is dependent upon the application to which the system is applied.

The output terminal 56 of flip-flop 54 (FF1) is connected to the input terminal of a monostable multivibrator or one-shot circuit 66 (OS1). The receipt of such an input pulse causes the one-shot circuit 66 to revert to its unstable state for a period of time determined by the values of the resistor 68 (R1) and the capcitor 70 (C1). The complementary output terminal Q 72 of the one-shot circuit 66 is connected to the input lead of a second monostable multivibrator or one-shot circuit 74 (OS2). The period of instability of the one-shot circuit 74 is controlled by the variable settings of the resistors 76 (R2A) and 78 (R2B) and the capacitor 80 (C2).

The true output terminal 82 of the one-shot circuit 66 is connected to the reset terminal of first and second bistable flip-flop circuits 84 (FF3) and 86 (FF4) by means of a conductor 88.

The true output terminal Q of the second one-shot circuit 74 is connected by a conductor 90 to a junction point 92 between a conductor 94 leading to a first terminal of a coincidence circuit (AND circuit) 96 (A1) and by a conductor 98 to a corresponding first terminals of first and (O1) and second (O2) OR circuits 100 and 102 which are respectively connected at their outputs to the Set input terminals of the flip-flops 84 and 86. The complementary output terminal Q of one-shot circuits 74 is connected by a conductor 104 to an input terminal of a second coincidence circuit (AND gate) 106 (A2). The other input to each of the AND gates 96 and 106 come from the Celsig unit which, as already mentioned, produces pulses of a repetition rate directly proportional to the speed of rotation of the output shaft of the engine. The output terminal of AND gate 96 is connected to the "Up" terminal of an up-down counter 108. This type of counter is commercially available in integrated circuit form and hence, it is not believed necessary to describe in detail the internal construction of such a device. The Down terminal of the counter 108 is connected to the output of the AND gate 106. The Reset terminal 110 is coupled through a capacitor 112 to the complementary output terminal 72 of the one-shot circuit 66 and a resistor 114 couples said reset terminal 110 to ground.

A second terminal of OR circuit 100 is connected by conductors 116, 118 and 120 to the complementary output terminal Q of the J-K flip-flop 60. The second input terminal of OR gate 102 is connected by means of conductors 122 and 124 to the true output terminal Q of the flip-flop 60.

The up-down counter 108 has an output line 126 which is connected to first input terminals of first (O3) and second (O4) OR gates 128 and 130. The OR gate 128 receives a second input from the complementary output terminal Q of the flip-flop 84 while the second input to the OR gate 130 comes from the complementary output terminal Q of the flip-flop 86. The output terminals of the gates 128 and 130 are respectively connected to the Set input terminals of flip-flops 132 (FF5) and 134 (FF6). The Reset terminal of the flip-flop 132 is connected by the conductor 118 to the complementary output terminal of the flip-flop 60. The Reset terminal of flip-flop 134 is connected by conductor 124 to the true output terminal Q of the flip-flop 60.

Also included in the digital electronic control network are a plurality of three input coincidence circuits 136 (A3), 138 (A4), 140 (A5) and 144 (A6). Each of these gates has one input thereof connected by conductors 146, 148 and 150 to the complementary output terminal Q of the one-shot circuit 66. The true output terminal 62 of the flip-flop 60 is connected by conductors 150 and 152 to a second input terminal of the AND gate 136 and the remaining input terminal of the AND gate 136 is connected to the complementary output terminal Q of the flop-flop 134 by conductor 154. The second input terminal of AND gate 138 is connected by conductor 120 to the complementary output terminal Q of the flip-flop 60 as is the second input terminal of the AND gate 144. The remaining input terminal of AND gate 138 is connected to the true output terminal of the flip-flop 132. A conductor 156 couples a second input terminal of AND gate 140 to the true output terminal Q of flip-flop 60 by way of conductors 124 and 150. The remaining input terminal 20 of the AND gate 140 is connected by conductor 158 to the true output terminal Q of the flip-flop 134. Finally, the third input terminal of the AND gate 144 is connected by conductor 160 to the complementary output terminal Q of the flip-flop 132.

AND gates 136 and 138 have their output terminals connected to first and second input terminals of an (05) OR gate 162 whereas the AND gates 140 and 144 each have their output terminals connected to the input terminals of an (06) OR gate 164. The output signals from the gates 162 and 164 are connected to a servo device (not shown) used to modify the setting of the engine control parameter in accordance with the signals which they carry. This operation will become more apparent from the following description of the mode of operation of the digital circuit of FIG. 3.

OPERATION - FIGURE 3

The dither oscillator 53 in FIG. 3 consists of an integrated circuit pulse oscillator set to oscillate at a predetermined frequency equal to four times the selected engine dither frequency. It is to be understood that this frequency is not critical and may vary a few percent with variations in operating temperature. The oscillator output is then frequency divided by the J-K flip-flops 54 and 60 such that the output of flip-flop 54 is a rectangular puse of exactly equal "on" and "off" times having a frequency one-half of that of the dither oscillator 53. The output of the flip-flop 60 is similar rectangular pulse of a frequency equal to one-half of that of the output from the flip-flop 54.

In the following description of the operation, conventional notation is employed wherein the true output terminal Q of a flip-flop is "high" (5 volts) and the complementary output terminal Q is low (O volts) when the particular flip-flop is in its "Set" state. Similarly, the true output terminal Q is low and the complementary output terminal Q is high when the flip-flop is in its arbitrarily defined "Reset" state.

When flip-flop 54 becomes "Set" by application of a pulse thereto from the dither oscillator 53, it toggles the flip-flop 60 and also applies a triggering pulse to the one-shot circuit 66. Again considering the device as being applied to an engine spark ignition system, assume that the triggering of the one-shot circuit 66 marks the beginning of an Advance dither signal to the engine. The "on" time of one-shot circuit 66 is adjusted by resistor 68 and capacitor 70 to give a desired phase delay for the specific engine involved. The purpose of this desired phase delay will be explained more fully hereinbelow.

When one-shot circuit 66 reverts to its stable or Reset state, a high signal results on its complementary output terminal Q and is coupled back by way of conductor 150 and capacitor 112 to the Reset input terminal of the up-down counter 108. The reversion of the one-shot 66 to its Reset state also produces a change on the output line 82 for resetting the flip-flops 84 and 86. Further, the high output signal on conductor 72 is applied as a trigger pulse to the second one-shot circuit 74 causing it to momentarily revert to its unstable state the time period of which is adjustable by means of variable resistor 76 and the capacitor 80. This time interval is adjusted to be equal to approximately one-half of the engine's advance period. During the time that the one-shot circuit 74 is in its "Set" state, its true output terminal Q carries a high signal which is fed back by conductor 90 to one terminal of AND gate 96, thereby enabling this gate. Pulses from the Celsig unit therefore pass through AND gate 96 to the "Up" terminal of the up-down counter 108. When one-shot circuit 74 returns to its "Reset" state, AND gate 96 is disabled while AND gate 106 is enabled by the high signal which is applied thereto by way of conductor 104. With gate 106 enabled, pulses from the Celsig unit pass through the gate to the "Down" terminal of counter 108. Thus, it can be seen that the counter 108 counts up during the time that the one-shot circuit 74 is in its "Set" state and counts down while it is in its "Reset" state.

If it is assumed that the "Set" and "Reset" time periods of the one-shot circuit 74 are equal and further, that the engine accelerates during the Advance mode of the dither cycle, the counter 108 will receive more pulses from the Celsig unit during the "down" count period than it received during the "up" count period. Hence, at the end of the "down" count period the counter 106 will store a negative number. It is apparrent, then, that at some point during the "down" count period, the total count passes through zero. When this occurs, the counter 108 whose output terminal has been high, will produce a low pulse on conductor 126 which connects to the OR gates 128 and 130. It should now be observed that during the period of the down count, OR gate 102 was disabled by the high signal which it received from the true output terminal Q of the flip-flop 60 by way of conductors 150, 124 and 122. On the other hand, OR gate 100 was enabled because its second input terminal was held low by the signal applied to it from the complementary output terminal Q of flip-flop 60 by way of conductors 116, 118 and 120.

At the beginning of the down count, when the one-shot circuit 74 returned to its "Reset" state, the output from OR gate 100 goes low, thereby setting the flip-flop 84. With flip-flop 84 "Set," the signal appearing on its complementary output terminal is low, allowing the counter output pulse on line 126 to pass through OR circuit 128 and "Set" the flip-flop 132. The resulting high output signal on the true output terminal of flip-flop 132 partially enables AND gate 138 so that when the flip-flop 60 returns to its "Reset" state at the end of the engine Advance period, gate 138 will be fully enabled and will output a pulse to the output Advance terminal 166. This signal, when applied to a suitable electrical to mechanical transducer causes an incremental change in the spark timing in the Advance direction. This signal persists during the entire retard dither period, except during the time when the one-shot circuit 66 is in its "Set" state. The "Set" state of one-shot circuit 66 as determined by the resistor 68 and the capacitor 70 determine the amount of "off-set." Thus, acceleration during the dither Advance operation results in an Advance output signal on the conductor 166.

Next to be considered is the case where the engine decelerates during the dither Advance period.

As was previously described, the dither oscillator 53, the flip-flops 54 and 60 and the one-shot circuit 74 first enable the AND gate 96 and then the AND gate 106 for equal periods. When the gate 96 is enabled, the Celsig pulses proportionate to the angular velocity of the output shaft pass through the gate 96 to advance the counter 106 upward. When the gate 106 is enabled and gate 96 is disabled, the Celsig pulses pass through the gate 106 to the Down terminal of the counter 108 causing the counter to be decremented. Under the assumed condition, the counter 108 receives more engine pulses from the Celsig during the "up" count than during the "down" count so that at the end of the counting period, a positive number remains in the counter 108. In this event, there is no counter output pulse produced on line 122 so that flip-flop 132 remains in its "Reset" condition. The complementary output terminal of flip-flop 132 provides a signal on conductor 160 which enables AND gate 144 and, during the retard period of the dither, the second input terminal of gate 144 is enabled by the output signal appearing at the Q terminal of flip-flop 60 to which it is connected. As long as one-shot circuit 66 is in its "Reset" condition, AND gate 144 remains enabled and signal passes through OR gate 164 to the output Retard terminal 168. This signal is applied to a transducer (not shown) which effects an incremental adjustment to the spark timing mechanism in the retard direction.

During the retard portion of the dither pulse appearing on line 64, line 64 is low and line 120 is high. Under this circumstance, the OR gate 100 is disabled while the OR gate 102 is enabled. As before, when the one-shot circuit 66 returns to its "Reset" state, it resets the counter 108, and the flip-flops 84 and 86. Subsequently, the one-shot circuit 74 is triggered temporarily enabling AND gate 96 and causing the counter to count up. At the conclusion of the delay period established by one-shot circuit 74, gate 96 is disabled while gate 106 is enabled and the counter is decremented. If it is assumed that the engine shaft accelerated during the retard portion of the dither cycle, the number of down pulses received is greater than the number of up pulses such that a signal is produced on the counter output line 126 as the count passes through zero. Because during the retard portion of the dither cycle, flip-flop 86 is "Set" while flip-flop 84 is "Reset," OR gate 130 will pass the counter output pulse on line 126 to "Set" the flip-flop 134. Setting of flip-flop 134 partially enables the AND gate 140 and disables the AND gate 136. Hence, when flip-flop 60 switches back to its "Set" state the gate 140 will be fully enabled and will pass an output signal through OR gate 164 to the retard output terminal 168. The effect of this signal will be to cause the transducer device to which it is applied to further retard the parameter setting since it was a retard condition that caused the engine shaft to accelerate.

On the other hand, if it is assumed that the dither in the retard direction caused the output shaft to decelerate the number of up pulses counted would exceed the number of down pulses counted such that the output from the counter on line 126 would remain high. Under this condition, the OR gate 130 would not pass a pulse to Set the flip-flop 134 and it would remain cleared. As such, the high output signal on conductor 154 partially enables AND gate 136 and the low signal on conductor 158 disables the gate 140. Hence, when the flip-flop 60 is again Set at the completion of the retard portion of the dither cycle, gate 136 is fully enabled and passes an output signal through the gate 162 to the Advance terminal 166. This signal is utilized by the transducer to cause an advance in the setting of the machine speed control parameter (spark timing).

In some instances it is desirable to retard the spark timing from the optimum value to eliminate incipient knock. Also, it is sometimes desirable to introduce a fixed amount of retard from the optimum value, i.e., the value that gives the maximum rpm, so as to minimize NOx emissions. This may be accomplished by making the Advance and Retard periods of the dither cycle unequal. For example, instead of having both the Advance portion and Retard portion 0.1 second, the Advance period can be made to persist for 0.09 second while the Retard period lasts for 0.11 second.

Because the dither pulses are spaced equally, the counter will count more pulses during the retard portion of the cycle than during the Advance period. The logic circuit will, therefore, produce a signal tending to retard the timing. The retarded timing spoils combustion efficiency and slows down the engine shaft. The slowdown is more during the Retard portion of the dither cycle than during the Advance portion. This causes a decrease in pulse count during the Retard period relative to the pulse count during the Advance period. Finally, an equilibrium point is reached. The fluctuating engine speed (faster during Advance than during Retard period) produces a pulse count difference which just balances the excess Retard pulses due to the longer Retard period. The engine will run continuously with retarded timing from the optimum value and with spoiled fluctuating combustion efficiency and rotating speed. This speed fluctuation will be more than that which occurs with a non-biased condition, but may be maintained small enough so as not to perceptably effect engine smoothness.

Referring to FIG. 3, this biasing operation can be accomplished by adjusting the "on" period of one-shot circuit 74. If one-shot circuit 74 has its on-time reduced, the "up" count will be decreased and the "down" count will be increased. This stimulates an acceleration response to dither advance so as to cause an Advance signal to appear at the output. This would continue until there was enough actual deceleration during dither advance to offset the bias. Thus, an Advance bias would result. On the other hand, by increasing the on-time of the one-shot circuit 74, a Retard bias results. Resistors 76 and 78 along with the capacitor 80 determine the "on" period of the one-shot 74 and can therefore be adjusted to give a desired bias value.

Figure 4:
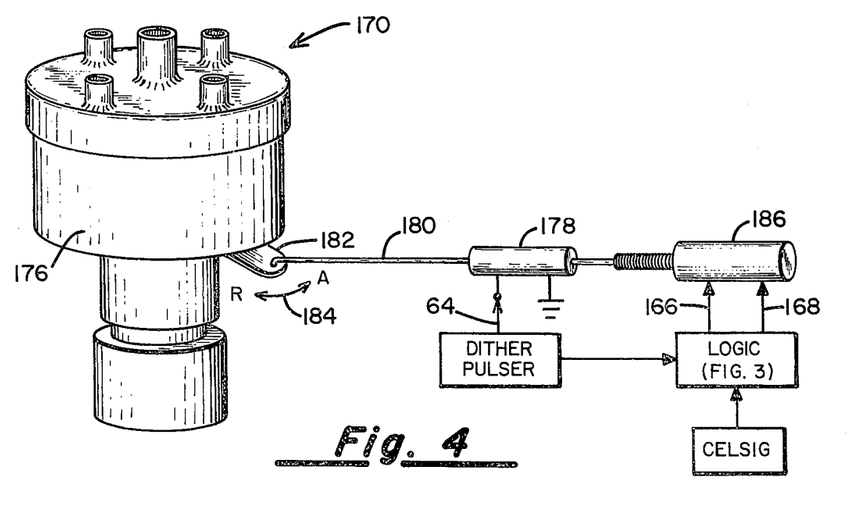
FIG. 4 illustrates the manner in which the invention may be applied to the spark timing control for an internal combustion system.

Referring now to FIG. 4, an explanation will be given as to how the present invention may be applied to the spark advance control of the distributor of an internal combustion engine having spark ignition.

Indicated generally be numeral 170 is a distributor for a four cylinder engine. The dither pulses appearing on line 64 (FIG. 3) are applied as an input to a linear solenoid 178 which is coupled by a linkage rod 180 to a rotatable lever 182 associated with the conventional Advance mechanism in the distributor 170. The dither pulses cause the solenoid 178 to periodically rotate the lever 182 back and forth as indicated by arrow 184. The output from the dither pulser is also applied to the digital logic network of FIG. 3 as are the pulses from the Celsig. The logic network including the up-down counter operates in the manner previously described to produce an output signal on either line 166 or 168 which may be connected to a reversible motor or other suitable transducer 186 for either increasing or decreasing the amount of spark advance as determined by the position of the lever 182, relative to the optimum timing.

Figure 5:
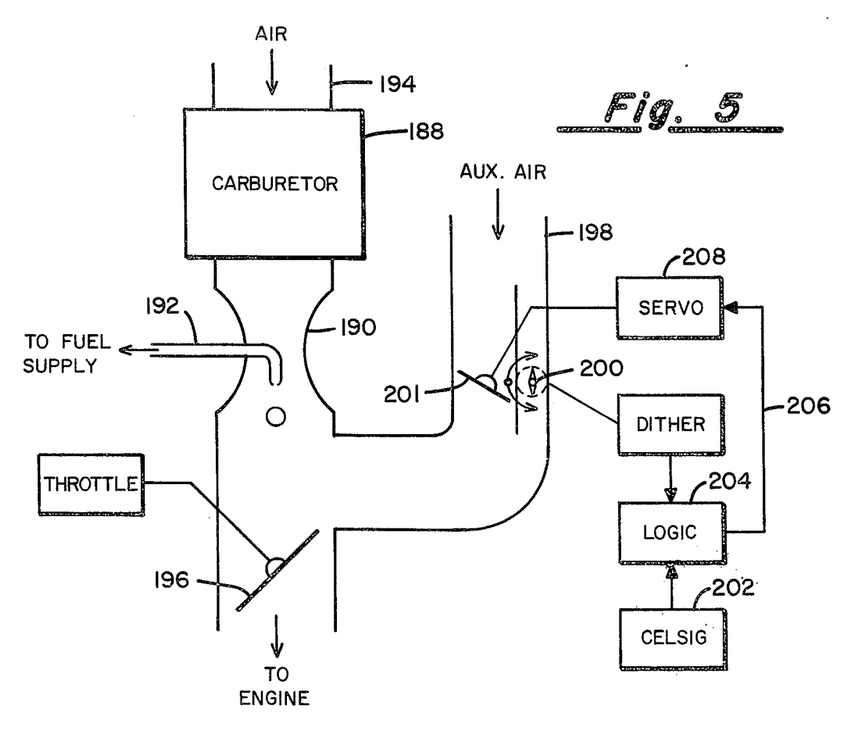
FIG. 5 illustrates the manner in which the invention may be applied to a carburetor type air/fuel control of an internal combustion engine.

Referring next to FIG. 5, a description will be given as to how the preferred embodiment may be applied to a conventional carburetor for optimizing the air/fuel ratio. In FIG. 5 there is shown schematically a carburetor 188 having a venturi 190 which operates to draw in fuel from a reservoir (not shown) through the inlet tube 192. The primary air inlet is indicated by numeral 194. Disposed between the carburetor and the engine's intake manifold is a manually operated throttle control member 196. Also included is an auxiliary air supply line 198 having disposed therein a small dither valve 200 and an auxiliary air flow control member 201. The dither oscillator produces bivalued pulses in the manner described which are utilized by a transducer (not shown) to periodically open and close the dither valve 200 to introduce slight variations in the amount of air flowing through the throttle control 196 to the engine. Thus, the air/fuel ratio is periodically enriched and enleaned depending upon whether the dither valve 200 is closed or open.

The Celsig unit 202 monitors the effect of this perturbation on the angular velocity of the engine's output shaft and provides to the logic unit 204 signals indicative of the instantaneous angular velocity of the output shaft. The logic unit 204 may be constructed in accordance with the circuitry depicted in FIG. 3. The digital logic network 204 also receives an output from the dither oscillator so that the number of pulses from the Celsig unit 202 occurring during equal portions of the dither pulses can be compared (subtracted), all as already described. The resulting output from the logic unit 204 appears on conductor 206 and is utilized by servo 208 to either further open or reduce the size of the air passage in the auxiliary air supply 198. Hence, for a given setting of the throttle position 196 the optimizer of the present invention serves to adjust the air/fuel ratio to yield maximum engine speed.

The invention may also be applied to an engine having fuel injection rather than a conventional carburetor.

In known fuel injection systems a plurality of sensors are conventionally employed for monitoring such things as manifold pressure, throttle position, air temperature, cooling water temperature, etc. These systems tend to be imperfect in that the optimum air/fuel ratio is an unknown function of more variables than the system has sensors for. The adaptive control system of the present invention obviates these difficulties. This is so because it responds to all parameters which influence the rotational speed of the output shaft. However, only one sensor, the Celsig, is needed. The digital logic network receives signals from the dither oscillator and the Celsig unit, and by comparing the two in the manner previously described, decides whether the setting that determines the air/fuel ratio should be made richer or leaner. Being free from numerous sources of error, it is inherently more precise.

The adaptive control offered by the present invention is not only inherently more accurate, but it ordinarily is much simpler and less expensive to provide than conventional fuel injection controls. With recent advances in microelectronics, the logic circuits add little to the complexity and cost of a control system and the elimination of a multiplicity of sensors and the associated interfaces is a substantial advantage. Furthermore, a single adaptive control device built in accordance with the present invention fits a wide range of engines, while a programmed control, conventionally used, has to be tailored to a single or to a group of practically identical applcations.

Figure 6:
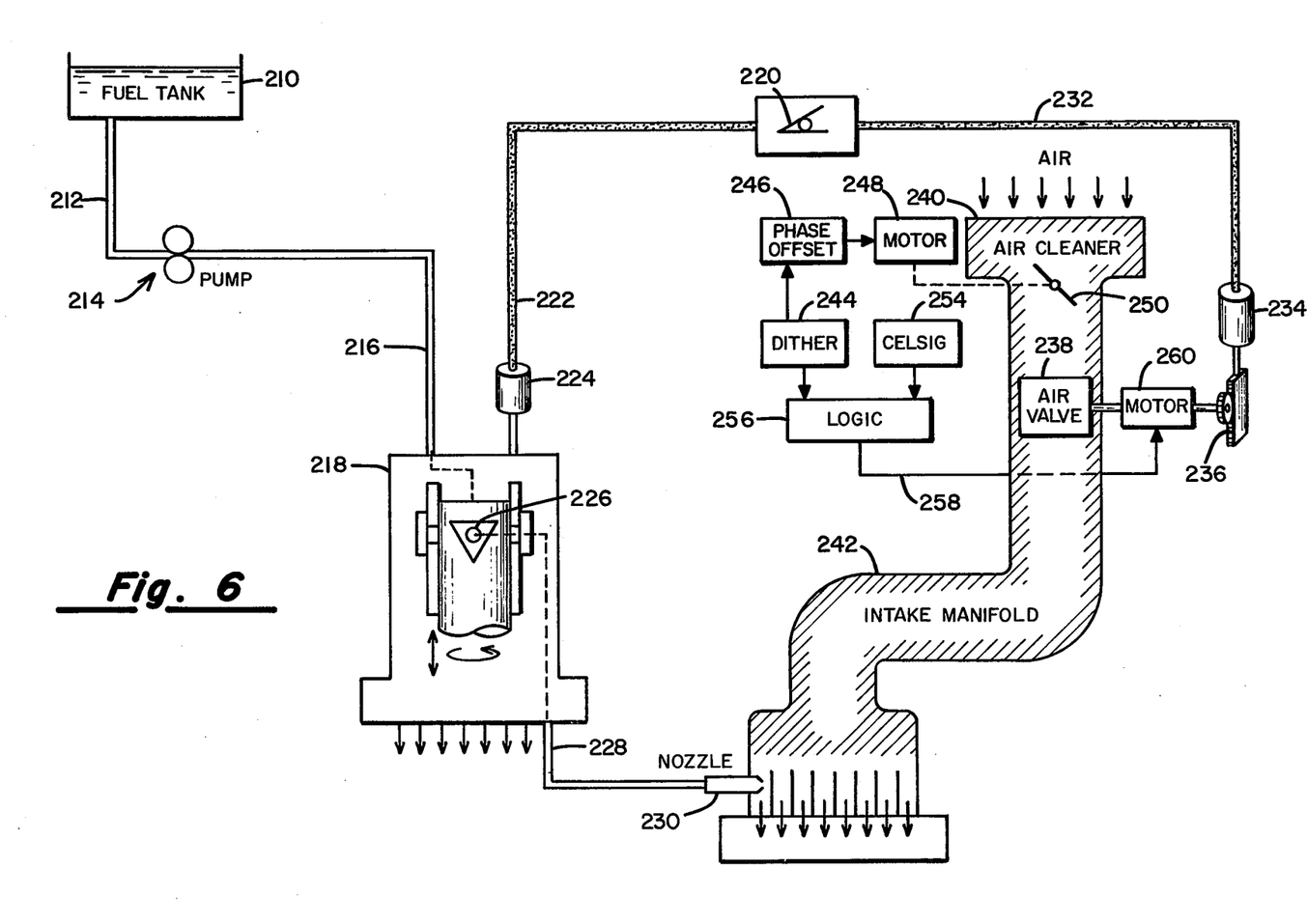
FIG. 6 illustrates the manner in which the preferred embodiment may be applied to an internal combustion engine having fuel injection.

In FIG. 6, a fuel tank 210 is provided which is connected by a fuel line 212 to the input of a fuel pump 214. The fuel pump 214 supplies fuel under constant pressure in line 216 to a fuel metering and distributing device 218. While the device is shown schematically, in general, it comprises a mechanism whereby a measured and controllable volume of fuel is dispensed at appropriate intervals to a plurality of fuel injection nozzles coupled to the cylinders of the engine. In the schematic drawing, the metering and distributing device 218 is coupled hydraulically to the operator footfeed 220 by means of hydraulic line 222 and hydraulic cylinder 224. Actuation of the footfeed 220 causes the device 218 to be raised or lowered thereby controlling the size of the orifice 226 through which the fuel may pass. Since, as mentioned, the pump 214 provides fuel under constant pressure, the size of the orifice 226 is determinative of the volume of fuel available. In addition to moving up and down to control the fuel volume crossing therethrough, the device 218 also rotates to dispense the metered fuel charge through fuel lines 228 and injection nozzles 230 to the engine cylinders in a desired sequence.

The manually operated footfeed 220 is also hydraulically coupled by way of hydraulic line 232 and cylinder 234 and a suitable gear train 236 to an air valve 238 disposed between an air inlet 240 and the engine's intake manifold 242. Thus, the air throttle valve 238 is stiffly linked hydraulically to the fuel metering and distributing unit 218 in such a manner that a fixed or variable programmed air/fuel ratio results. The manner in which the present invention may be incorporated in such a conventional system will now be described.

The dither oscillator and frequency divider network of FIG. 3 is represented by numeral 244 of FIG. 6. It is shown as being connected through a phase offset network 246 to a motor or other suitable transducer 248 which acts to convert an electrical signal to a mechanical motion for rotating or oscillating a small vane 250 disposed in the air channel 240. Thus, the amount of air flowing past the air valve 238 for a given setting of such air valve is varied by the dither vane 250.

The resulting change in engine output shaft speed is sensed by the Celsig unit 254 which is connected to the digital logic network 256 along with the output from the one-shot circuit 74 (FIG. 3) which is slaved to the dither oscillator. The logic network functions in the manner previously described to produce an electrical signal on conductor 258 which is connected to a suitable transducer, here shown as a motor 260, whose shaft is coupled to the air valve 238. The logic circuit 256 orders a slight rotation of the air throttle valve 238 clockwise or counterclockwise, depending on whether an enrichment or enleanment would improve engine performance.

Stated otherwise, the Celsig unit 254 informs the logic network 256 whether in the particular moment the shaft speed is increasing or decreasing. The dither circuit 244 informs the logic network 256 as to whether at the particular moment, the air/fuel ratio is increasing or decreasing. The logic compares the two informations received and makes its decision as follows:

Mixture richening + Rpm Up . . . . . Close Throttle
Mixture richening + Rpm Down . . . . . Open Throttle
Mixture leaning + Rpm Up . . . . . Open Throttle
Mixture leaning + Rpm Down . . . . . Close Throttle In this manner, a stepwise improvement of the engine's speed is achieved while the fuel rate is temporarily constant.

While the arrangement shown in FIG. 6 shows dithering of the air flow so as to obtain optimum fuel economy it should be apparent to those skilled in the art that it would also be possible to dither the fuel supply.

For the system to respond promptly, the dither valve 250 must fluctuate the air/fuel ratio with a high frequency. The amplitude of the fluctuations must be large enough for the Celsig unit 254 to sense the resulting power fluctuations, but not so large that it would be perceptively impair the engine's running smoothness. If the duration of a dither cycle is a fraction of a second as it should be in application to a motor vehicle, a phase offset is required to properly synchronize the dither and Celsig signals. Because of the delaying time constants, the recording of the engine's response to the dither pulses is somewhat delayed. To compensate for this, the motor 248 receives the pulses earlier than the logic unit 256 receives the Celsig pulses. The optimum phase offset expressed in milliseconds, is constant but expressed in degrees or fractions of the cycle duration, it varies with the dither frequency. Once the phase offset is set for the dither frequency, it may be left alone.

While a particular embodiment of the electronic digital adaptive type optimizing control system has been described, it is to be understood that various modifications may be made thereto. The following claims are, therefore, intended to cover any such modifications within the true spirit and scope of the invention.

What is claimed is:

1. An adaptive electronic control system for maximizing the speed of an engine shaft for a given setting of an engine speed modifying parameter, comprising:
   a. first means for producing regularly occurring dither pulses of a frequency, $f_1$;
   b. means coupled to receive said dither pulses for varying said parameter at said frequency, $f_1$, about said given setting;
   c. second means coupled to said shaft for continuously producing pulses at a rate substantially greater than the rate at which said dither pulses are produced and proportional to the instantaneous angular velocity of said shaft;
   d. digital logic means coupled to said first and second means for comparing the number of pulses produced by said second means during the period of one-half of first and second portions of said dither pulses; and
   e. means responsive to the output of said digital logic means for varying said parameter in a direction determined by the results of said comparison.

2. Apparatus as in claim 1 wherein said digital logic means includes: pulse subtracting means for determining the algebraic difference between the number of pulses produced by said second means during the period of one-half of first and second portions of said dither pulses.

3. Apparatus as in claim 2 wherein said pulse subtracting means comprises:
   a. an up-down counter having first and second input terminals and an output terminal;
   b. gating means connected to said first and second input terminals of said counter and to said first and second means for applying said pulses from said second means to said first input terminal during a first portion of said dither pulses and to said second input terminal during a second portion of said dither pulses; and
   c. means connected to said output terminal for storing for a predetermined time period an indication of whether the number of pulses applied to said first input terminal during said first portion of said dither pulse is less than the number of pulses applied to said second input terminal during said second portion of said dither pulse.

4. An adaptive electronic control system for maximizing the speed of an internal combustion engine shaft relative to the setting of the spark advance, comprising:
   a. first means for producing regularly occurring electrical dither pulses of a frequency, $f_1$;
   b. means coupled to receive said dither pulses for varying said spark advance back and forth about said given setting at said frequency, $f_1$;
   c. second means coupled to said shaft for continuously producing electrical pulses at a rate substantially greater than the rate at which said dither pulses are produced and proportional to the instantaneous angular velocity of said shaft;
   d. pulse counting means coupled to said first and second means for determining the algebraic difference between the number of pulses produced by said second means during a period of one-half of first and second equal portions of said dither pulses; and
   e. means responsive to the output of said counting means for varying said spark advance from said setting in a direction determined by the algebraic sign of said difference.

5. In combination with an internal combustion engine of the type having a carburetor, a throttle control and an output shaft, an adaptive electronic control system for maximizing the speed of said output shaft for a given setting of said throttle control, comprising:
   a. first means for producing regularly occurring electrical dither pulses of a frequency, $f_1$;
   b. means coupled to receive said dither pulses for periodically varying the amount of air passing through said throttle control;
   c. second means coupled to said output shaft for continuously producing electrical pulses at a rate substantially greater than the rate at which said dither pulses are produced and proportional to the instantaneous angular velocity of said shaft;
   d. pulse counting means coupled to said first and second means for determining the algebraic difference between the number of pulses produced by said second means during the period of one-half of first and second equal portions of said dither pulses; and e. means responsive to the output of said counting means for increasing or decreasing the rate of flow of air through said throttle control determined by the algebraic sign of said difference.

6. In combination with an internal combustion engine of the type having a fuel pump for applying fuel under pressure through a fuel metering and distributing valve to the cylinders of said engine and an air flow control valve for controlling the flow rate of air into said cylinders and an output shaft, an adaptive electronic control system for maximizing the speed of said output shaft for a given setting of said fuel metering and distributing valve and said air flow control valve, comprising:

a. first means for producing regularly occurring electrical dither pulses of a frequency $f_1$;

b. means coupled to receive said dither pulses for varying the amount of fuel flowing through said fuel metering and distributing valve above and below the flow normally permitted by said given setting of said fuel metering and distributing valve;

c. second means coupled to said output shaft for continuously producing electrical pulses at a rate substantially greater than the rate at which said dither pulses are produced and proportional to the instantaneous angular velocity of said output shaft;

d. pulse counting means coupled to said first and second means for determining the algebraic difference between the number of pulses produced by said second means during a period of one-half of first and second equal portions of said dither pulses; and e. means responsive to the output of said counting means for opening or closing said air flow control valve as determined by the algebraic sign of said difference.

7. A method of adjusting the setting of a machine speed modifying parameter for maximizing the speed of its output shaft relative to the setting of said parameter comprising the steps of:

a. generating regularly occurring dither pulses of a first frequency;

b. applying said pulses to a first transducer for periodically varying said parameter slightly above and below said setting;

c. generating second pulses at a second frequency substantially greater than said first frequency, said second frequency being directly proportional to the angular velocity of said shaft;

d. comparing the number of said second pulses generated during the period of one-half of first and second portions of said dither pulses; and e. varying said parameter away from said setting in a direction determined by the results of said comparison.

8. The method as in claim 7 wherein said step of comparing includes:

a. counting the number of said pulses occurring during a first portion of said dither pulses;

b. counting the number of said second pulses occurring during a second portion of said dither pulses; and c. subtracting the second count from the first count for producing a control signal indicative of the algebraic sign of the difference.

9. The method as in claim 8 wherein said step of varying said parameter away from said setting includes: applying said control signal to a second transducer operatively connected to adjust said setting of said machine speed modifying parameter.

* * * * *